A. PETERSEN.
SHAFT PROTECTOR.
APPLICATION FILED JAN. 3, 1919.

1,361,403.  Patented Dec. 7, 1920.

Inventor
Anker Petersen

UNITED STATES PATENT OFFICE.

ANKER PETERSEN, OF MOBILE, ALABAMA.

SHAFT-PROTECTOR.

1,361,403.  Specification of Letters Patent.  Patented Dec. 7, 1920.

Application filed January 3, 1919. Serial No. 269,447.

*To all whom it may concern:*

Be it known that I, ANKER PETERSEN, a citizen of Denmark, residing at Mobile, in the county of Mobile and state of Alabama, have invented certain new and useful Improvements in Shaft-Protectors, of which the following is a specification.

This invention relates to marine propulsion, and more especially to screw propeller shaft fitting and protection; and the object of the same is to produce means for housing the steel propeller shaft so as to protect it as far as possible from the action of water, barnacles, and other influences which tend toward its impairment.

This object is carried out by mounting a brass sleeve very tightly around that portion of the shaft which rotates within its bearing and projects beyond the same to and into the hub of the propeller and closing the end of the shaft projecting beyond the propeller by nuts to protect its extremity.

As a further means of protecting the steel shaft, I employ a brass tube extending from the bearing inward through the stern post and surrounding the shaft for a considerable distance inboard.

Figure 1:
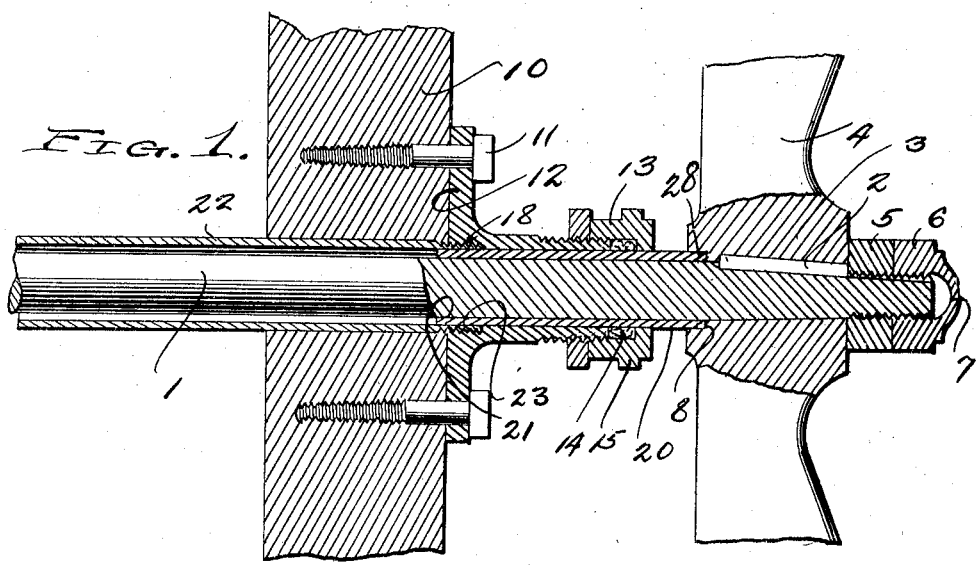

Further details are set forth in the following specification and claim, and reference is made to the drawings wherein Figure 1 is a vertical section through the rear portion of the shaft and all parts attached thereto.

Figure 2:
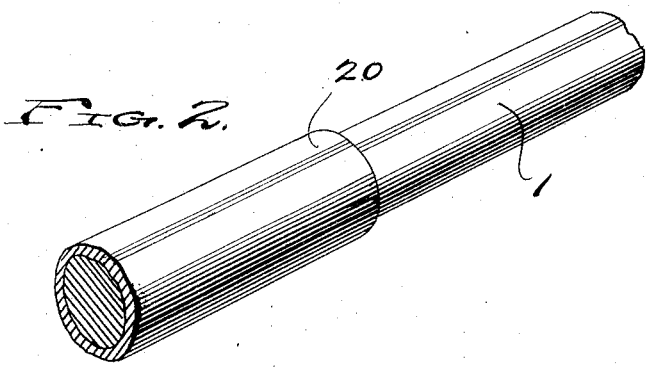

Fig. 2 is a perspective detail of the shaft and its sleeve.

The steel shaft herein bears the numeral 1, and its rear portion is tapered and slotted for a key 2 which keys the hub 3 of the propeller 4 thereon. Its extremity is threaded for a nut 5 which bears against said hub, and finally a cap nut 6 is set up tight against the lock nut 5, its cap 7 covering the extreme tip of the shaft and protecting it thoroughly. The inner end of the hub 3 is recessed as at 8 for a purpose yet to appear.

Secured to the stern post 10 by lag screws 11 is a bearing 12 which in the present case is shown as projecting a considerable distance beyond the stern post and threaded to receive a stuffing box 13 containing packing 14; and the bore of the bearing at its inner end is enlarged or recessed and threaded as shown at 18.

Instead of mounting the main steel shaft 1 directly through the bearing and stuffing box, and keying it within the propeller hub, by my present invention I surround it with a brass sleeve indicated at 20. This sleeve should fit very tightly on the shaft, and my preferred manner of so fitting it is to apply it while the parts are hot and press it tightly in place. At its inner end 21, this sleeve projects slightly beyond the bearing 12. At this outer end 28 it projects into the recess 8 in the hub 3 of the propeller 4. Between its ends the body fits rotatably within the bearing and through the gland nut 15 of the stuffing box 13. A second brass sleeve or tube 22 is also inserted from the inside through the stern post 10 as shown. Its bore is of sufficient size to receive the inner end of the sleeve 20 which rotates therein, and at its outer end 23 this tube is externally threaded so as to engage the threads within the recess 18 of the bearing. The body of this tube extends completely through the stern post 10 and as far inward along the main shaft as may be desired, and its bore is of such size that it does not touch the shaft. Therefore the shaft is inclosed for a considerable distance in brass. It turns within the fixed sleeve or tube 22, and it carries with it the other sleeve 20, the latter rotating within the bearing and within the outer end of the fixed sleeve. Moreover the sleeve 20 extends beyond the bearing and across the space between its nut 15 and the hub 3 and partly into the latter; thence the shaft extends on through the hub and through the nuts 5 and 6 and its extremity is protected by the cap of the outer nut 6. Therefore, all that portion of the steel shaft which extends to the rear of the stern post is protected in one way or another, and even that portion of the shaft through the post and on the interior thereof is housed within the sleeve or tube 22. I have found that the propeller shaft on my boat as thus protected is kept entirely free of rust and objectionable accumulations or conditions.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my inven- tion, what I claim as new and desire to secure by Letters Patent is:—

In combination with a stern post, a propeller shaft extending therethrough, a propeller keyed upon the outer end of said shaft, said propeller provided with a recess formed therein, of a protector sleeve secured upon said shaft and spanning the distance between the stern post and said propeller and having one end thereof fitting in the recess formed in said propeller, a bearing mounted upon said stern post and provided with a radiating flange, means extending through said flange for anchoring the same in engagement with said stern post, said bearing provided with an externally threaded portion, a gland nut threaded upon said externally threaded portion, a stuffing box threaded upon said externally threaded portion, packing means mounted within said stuffing box and fitting snugly in engagement with said protector sleeve for constituting an efficient seal at the outer end of said bearing, said bearing provided with a threaded recess near its inner end, and a sleeve surrounding said propeller shaft and, threaded into said threaded recess formed in said bearing.

In testimony whereof I affix my signature in presence of two witnesses.

ANKER PETERSEN.

Witnesses:
J. M. WILKINS,
H. L. HILTON.